(12) United States Patent
Vigier et al.

(10) Patent No.: US 10,278,197 B2
(45) Date of Patent: *Apr. 30, 2019

(54) PRIORITIZING BEACON MESSAGES FOR MOBILE DEVICES

(71) Applicant: Apple Inc., Cupertino, CA (US)

(72) Inventors: Benjamin Vigier, San Francisco, CA (US); Corey G. Fugman, Saratoga, CA (US); Filip Krsmanovic, Moutain View, CA (US); Mathieu Roig, Sunnyvale, CA (US); Yingfeng Su, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/234,886

(22) Filed: Aug. 11, 2016

(65) Prior Publication Data
US 2016/0353463 A1 Dec. 1, 2016

Related U.S. Application Data

(63) Continuation of application No. 14/592,638, filed on Jan. 8, 2015, now Pat. No. 9,426,615.
(Continued)

(51) Int. Cl.
*H04W 72/10* (2009.01)
*H04W 4/80* (2018.01)
(Continued)

(52) U.S. Cl.
CPC .......... *H04W 72/10* (2013.01); *H04B 17/318* (2015.01); *H04W 4/02* (2013.01);
(Continued)

(58) Field of Classification Search
CPC ....... H04W 84/18; H04W 48/08; H04W 4/02; H04W 48/16; H04W 8/005; H04W 4/021;
(Continued)

(56) References Cited

U.S. PATENT DOCUMENTS 6,002,918 A 12/1999 Heiman
6,816,730 B2 11/2004 Davies
(Continued)

FOREIGN PATENT DOCUMENTS

EP 2 733 502 5/2014
WO WO200157758 9/2001
WO WO2014130958 8/2014

OTHER PUBLICATIONS

U.S. Appl. No. 14/284,336, filed May 21, 2014, Beacon-Triggered Code Redemption for Mobile Devices, Robbin et al.
(Continued)

*Primary Examiner* — Olumide Ajibade Akonai
(74) *Attorney, Agent, or Firm* — Fish & Richardson P.C.

(57) ABSTRACT

Techniques and systems for prioritizing beacon messages are disclosed. Such a technique can include receiving, at a mobile device, beacon messages from multiple beacon devices over short-range communication links, the beacon devices being within a vicinity of an establishment, the beacon messages being configured to provide content associated with the establishment; determining, at the mobile device, priorities of the beacon messages based on one or more criteria; selecting, at the mobile device, a beacon message of the beacon messages based on the priorities to produce a selected beacon message; and presenting the selected beacon message through the mobile device.

24 Claims, 11 Drawing Sheets

Related U.S. Application Data

(60) Provisional application No. 62/057,589, filed on Sep. 30, 2014.

(51) Int. Cl.

| | | |
|---|---|---|
| *H04W 4/06* | (2009.01) | |
| *H04W 4/02* | (2018.01) | |
| *H04W 40/24* | (2009.01) | |
| *H04W 8/00* | (2009.01) | |
| *H04B 17/318* | (2015.01) | |
| *G06Q 30/02* | (2012.01) | |

(52) U.S. Cl.
CPC ............ *H04W 4/023* (2013.01); *H04W 4/06* (2013.01); *H04W 4/80* (2018.02); *H04W 8/005* (2013.01); *H04W 40/244* (2013.01); *G06Q 30/0241* (2013.01); *G06Q 30/0251* (2013.01)

(58) Field of Classification Search
CPC ... H04W 64/00; H04W 40/244; H04W 84/12; H04W 4/008; H04W 4/04; H04W 4/12; H04W 40/24; H04W 4/023; H04W 4/06; H04W 4/80; H04W 12/02; G06Q 30/0241; G06Q 30/0251; G06Q 30/02; G06Q 30/0261; G06Q 50/01; H04L 51/32; H04L 51/24
See application file for complete search history.

(56) References Cited

U.S. PATENT DOCUMENTS

| | | | |
|---|---|---|---|
| 7,010,267 B2 | 3/2006 | Vanluijt | |
| 7,397,424 B2 | 7/2008 | Houri | |
| 7,653,573 B2 | 1/2010 | Hayes | |
| 7,712,657 B1 | 5/2010 | Block | |
| 7,856,234 B2 | 12/2010 | Alizadeh-Shabdiz et al. | |
| 7,890,116 B2 | 2/2011 | Salokannel | |
| 7,899,583 B2 | 3/2011 | Mendelson | |
| 7,924,149 B2 | 4/2011 | Mendelson | |
| 8,054,219 B2 | 11/2011 | Alizadeh-Shabdiz | |
| 8,160,045 B1 | 4/2012 | Chhabra | |
| 8,223,074 B2 | 7/2012 | Alizadeh-Shabdiz | |
| 8,254,414 B2 | 8/2012 | Sakoda | |
| 8,369,264 B2 | 2/2013 | Brachet et al. | |
| 8,478,297 B2 | 7/2013 | Morgan et al. | |
| 8,626,135 B1 | 1/2014 | Schilit et al. | |
| 8,645,213 B2 | 2/2014 | Granbery | |
| 8,831,642 B2 | 9/2014 | Moldaysky | |
| 8,836,580 B2 | 9/2014 | Mendelson | |
| 8,866,673 B2 | 10/2014 | Mendelson | |
| 8,896,485 B2 | 11/2014 | Mendelson | |
| 8,941,485 B1 | 1/2015 | Mendelson | |
| 8,983,493 B2 | 3/2015 | Brachet et al. | |
| 9,020,687 B2 | 4/2015 | Mendelson | |
| 9,204,251 B1 | 12/2015 | Mendelson | |
| 9,204,257 B1 | 12/2015 | Mendelson | |
| 9,317,867 B2 | 4/2016 | Johnson | |
| 9,426,615 B2* | 8/2016 | Vigier ..................... | H04W 4/02 |
| 9,456,416 B2 | 9/2016 | Vigier et al. | |
| 2003/0098892 A1* | 5/2003 | Hiipakka .............. | G06F 3/0481 715/846 |
| 2003/0200489 A1 | 10/2003 | Hars | |
| 2006/0104600 A1 | 5/2006 | Abrams | |
| 2006/0173790 A1 | 8/2006 | Park | |
| 2006/0180664 A1 | 8/2006 | Barrett et al. | |
| 2008/0154735 A1 | 6/2008 | Carlson | |
| 2010/0150122 A1 | 6/2010 | Berger | |
| 2010/0174599 A1 | 7/2010 | Rosenblatt | |
| 2010/0198614 A1* | 8/2010 | Chopra .................. | G16H 40/20 705/2 |
| 2010/0287052 A1 | 11/2010 | Minter | |
| 2011/0238514 A1 | 9/2011 | Ramalingam et al. | |
| 2011/0319072 A1 | 12/2011 | Ekici | |
| 2011/0320293 A1 | 12/2011 | Khan | |
| 2012/0042036 A1 | 2/2012 | Lau et al. | |
| 2012/0064855 A1 | 3/2012 | Mendelson | |
| 2013/0046602 A1 | 2/2013 | Grigg | |
| 2013/0094536 A1 | 4/2013 | Hui | |
| 2013/0099920 A1 | 4/2013 | Song | |
| 2013/0110728 A1 | 5/2013 | Kobres et al. | |
| 2013/0128786 A1 | 5/2013 | Sultan et al. | |
| 2013/0159027 A1 | 6/2013 | Naor | |
| 2013/0210360 A1* | 8/2013 | Ljung ..................... | H04W 4/80 455/41.2 |
| 2013/0212017 A1 | 8/2013 | Bangia | |
| 2013/0297422 A1 | 11/2013 | Hunter | |
| 2013/0316725 A1 | 11/2013 | MacGougan | |
| 2014/0025232 A1 | 1/2014 | Cuddihy | |
| 2014/0025504 A1 | 1/2014 | Butler et al. | |
| 2014/0058897 A1 | 2/2014 | Yang | |
| 2014/0064166 A1 | 3/2014 | HomChaudhuri | |
| 2014/0081720 A1 | 3/2014 | Wu | |
| 2014/0089061 A1 | 3/2014 | Vitale | |
| 2014/0135042 A1 | 5/2014 | Buchheim | |
| 2014/0136312 A1 | 5/2014 | Saksena et al. | |
| 2014/0143139 A1 | 5/2014 | Koplovitz | |
| 2014/0154984 A1 | 6/2014 | Perrin et al. | |
| 2014/0207614 A1 | 7/2014 | Ramaswamy | |
| 2014/0207682 A1 | 7/2014 | Wolfond | |
| 2014/0214598 A1 | 7/2014 | Acker, Jr. et al. | |
| 2014/0236478 A1 | 8/2014 | Mermeistein | |
| 2014/0274150 A1 | 9/2014 | Marti et al. | |
| 2014/0324994 A1* | 10/2014 | Sun ........................ | H04L 51/04 709/206 |
| 2014/0358835 A1 | 12/2014 | Marti | |
| 2015/0063323 A1* | 3/2015 | Sadek ............... | H04W 72/1215 370/336 |
| 2015/0079942 A1 | 3/2015 | Kostka et al. | |
| 2015/0120509 A1 | 4/2015 | Moring | |
| 2015/0140982 A1* | 5/2015 | Postrel .................. | H04W 4/008 455/418 |
| 2015/0235486 A1 | 8/2015 | Ellis et al. | |
| 2015/0289207 A1 | 10/2015 | Kubo | |
| 2015/0294517 A1 | 10/2015 | Herrala | |
| 2015/0339694 A1 | 11/2015 | Robbin et al. | |
| 2016/0092943 A1 | 3/2016 | Vigier et al. | |
| 2016/0092966 A1 | 3/2016 | Vigier et al. | |
| 2016/0094940 A1 | 3/2016 | Vigier et al. | |
| 2016/0095063 A1 | 3/2016 | Vigier et al. | |
| 2016/0148270 A1 | 5/2016 | Vigier et al. | |

OTHER PUBLICATIONS

U.S. Appl. No. 14/586,489, filed Dec. 30, 2014, Beacon Triggered Processes, Vigier et al.
U.S. Appl. No. 14/592,674, filed Jan. 8, 2015, Scoring Beacon Messages for Mobile Device Wake-Up, Vigier et al.
U.S. Appl. No. 14/586,571, filed Dec. 30, 2014, Beacon Triggered Device to Device Content Transfer, Vigier et al.
International Search Report and Written Opinion in International Application No. PCT/US2015/048652, dated Nov. 2, 2015, 15 pages.
Sean Hargrave, "Apple pay and iBeacons—A Digital marketing Revolution Could Be on Its Way", London Media Advertising Daily, http://www.mediapost.com/publications/article/233982/apple-pay-and-ibeacons-a-digital-marketing-revo.htlm, Sep. 11, 2014, 3 pages.
Digital-download kiosks in store for retail, other verticals. (Jun. 24, 2009). Retrieved from https://www.kioskmarketplace.com/articles/digital-download-kiosks-in-store-for-retail-other-certicals-2/ (Year: 2009).

* cited by examiner

PRIORITIZING BEACON MESSAGES FOR MOBILE DEVICES

CROSS REFERENCE TO RELATED APPLICATIONS

This patent document is a continuation of and claims the benefit of the priority of U.S. patent application Ser. No. 14/592,638, filed on Jan. 8, 2015, which claims the benefit of the priority of U.S. Provisional Patent Application No. 62/057,589, filed on Sep. 30, 2014. The above-identified applications are incorporated herein by reference in its entirety.

TECHNICAL FIELD

This disclosure relates generally to radio frequency (RF) beacons.

BACKGROUND

Many modern mobile devices (e.g., a smart phone, tablet computer, wearable computer) include one or more radio frequency receivers, transmitters, or transceivers that allow one-way or two-way communications with other devices. For example, a mobile device can use a transceiver to communicate with a server on the Internet via a base station of a wireless network. In another example, a mobile device can include a receiver to receive low powered RF signals from devices such as RF beacons.

SUMMARY

Techniques and systems for prioritizing beacon messages for mobile devices are disclosed. An application running on a mobile device operating in a beacon-equipped operating environment can be configured to receive beacon messages and intelligently prioritize a presentation of the received beacon messages through the mobile device. In some implementations, beacon messages can be displayed by a user's mobile device based on one or more rule sets, priority preferences, priority configurations, and contexts generally based on proximity of the mobile device to beacon devices, user or environment context, timing, message frequency, inter-beacon border rules and the like.

For example, in a beacon-equipped retail store an initial "welcome to the store" beacon message may be repeatedly received by a customer's mobile device from a beacon device near a store entrance, but is desired by the store operator to be displayed on the mobile device only once in a given time period (e.g., once per day) so as not to annoy the customer with redundant displays of the same welcome message.

When the customer walks through a beacon-equipped environment with their mobile device, beacon messages broadcast from beacon devices throughout the environment can be received and prioritized by an application or operating system running on the user's mobile device and based on the prioritization are selectively presented (e.g., displayed) through the user's mobile device. Message priority can be determined based on one or more factors. In some implementations, message priority can be based on proximity to a beacon device; where messages broadcast from nearby beacon devices have a higher priority than messages broadcast from beacon devices farther away. In some implementations, message priority can be determined based on context such as a user's reason for visiting the environment.

In some implementations, a message priority can be determined based on context and proximity. Context information can include a user's activities before arriving to the environment (e.g., ordered a product to pick-up, scheduled an in-store consultation, scheduled a repair drop-off/pick-up) or what a user is doing while in the environment (e.g., the type of mobile device being used, the type of device the user is interacting with) can be used to determine message priority.

In some implementations, message priority can be based on inter-beacon border rules. For example, if a user's mobile device is receiving messages from more than one beacon device then inter-beacon border rules can be used to determine which beacon message to present first. Some implementations can use priority "stickiness" to determine how to prioritize the presentation of competing beacon messages. For example, if a user's mobile device is receiving a signal from a first beacon device and someone walks between the mobile device and the first beacon device, the signal from that first beacon device may become weaker than a signal from a second beacon device. Instead of immediately switching to displaying beacon messages from the second beacon device, an application or operating system running on the mobile device determines whether to present messages from the second beacon device rather than messages from the first beacon device. The decision can be based on length of time the signal strength dropped, the magnitude of the change in signal strength, and/or other factors and contexts.

In some implementations, message priority can be based on a history of previously presented messages, including tracking a number of times a message has been presented to a mobile device user. For example, if a beacon message has already been presented, then the beacon message should not be presented again unless there is an overriding factor present, e.g., new day, phone reset, retail store application restart, etc. Beacon devices can continuously broadcast the same message throughout the day or can alternate among a group of messages. An application on a mobile device can filter the beacon messages and only present one or more pertinent messages which are based on the determined message priority. The application or operating system of the mobile device can dynamically update message priorities based on continuously changing information such as changes in a received signal strength indicator (RSSI) due to the user moving about in the store.

In some implementations, an application or operating system can run a background process that monitors for beacon messages while the mobile device is in an idle state or while the screen of the mobile device is powered-off. The application or operating system can determine whether to wake the mobile device and display a received beacon message. However, if too many beacon messages are received by the mobile device and the mobile device is continually waking up to process the beacon messages, significant drain on the mobile device battery may occur. For example, if the mobile device user works in a mall, the user may frequently pass by a beacon-equipped store throughout the day and the user's mobile device may wake up each time the user passes the store due to proximity of the mobile device to a beacon device in the store. This and other scenarios can be mitigated by using a smart wake-up process, where the application or operating system of the mobile device can be configured to manage the frequency of wake-ups by determining a priority value that accounts for wake-up frequency and context. In some implementations, the priority value is based on how many times the mobile device has awakened within a time period (e.g., minute(s), hour(s), or day(s)).

A technique for prioritizing beacon messages for mobile devices can include receiving, at a mobile device, beacon messages from multiple beacon devices over short-range communication links, the beacon devices being within a vicinity of an establishment, the beacon messages being configured to provide content associated with the establishment; determining, at the mobile device, priorities of the beacon messages based on one or more criteria; selecting, at the mobile device, a beacon message of the beacon messages based on the priorities to produce a selected beacon message; and presenting the selected beacon message through the mobile device. Other implementations are directed to systems, devices and computer-readable, storage mediums.

These and other implementations can include one or more of the following features. Implementations can include determining range estimations between the mobile device and the beacon devices based on received signal strength values corresponding respectively to the beacon messages. Determining the priorities can include using the range estimations such that a message from a beacon device that is closer to the mobile device has a higher priority than a message from a beacon device that is farther away from the mobile device. Receiving the beacon messages can include receiving first beacon messages from a first beacon device, and receiving second beacon messages from a second beacon device. Determining priorities can include using hysteresis to prevent changes in the priorities that are due to transitory fluctuations in received signal strength values associated with the first beacon messages, the second beacon messages, or both. Determining the priorities can include determining a reason for a visit by a user of the mobile device to an environment including the beacon devices; and applying a rule set that is based on the reason to determine the priorities. Determining the priorities can include determining whether a beacon message of the beacon messages is a duplicate of a previously received beacon message. Determining the priorities can include assigning a first priority to a first beacon message of the beacon messages based on the first beacon message being a duplicate of a previously received beacon message; and assigning a second priority to a second beacon message of the beacon messages based on the second beacon message not being a duplicate of a previously received beacon message, where the second priority is higher than the first priority. Implementations can include retrieving content corresponding to one or more values included in the selected beacon message. Presenting the selected beacon message can include displaying the retrieved content on a screen of the mobile device.

A system for providing beacon-based applications can include a network interface configured to communicate with mobile devices; and processor electronics configured to store applications, including an application, for download to the mobile devices via the network interface. The application can include instructions to cause a mobile device to perform operations. The operations can include receiving beacon messages from multiple beacon devices over short-range communication links, the beacon devices being within a vicinity of an establishment, the beacon messages being configured to provide content associated with the establishment; determining priorities of the beacon messages based on one or more criteria; selecting a beacon message of the beacon messages based on the priorities to produce a selected beacon message; and presenting the selected beacon message through the mobile device.

An apparatus, such as a mobile device, for prioritizing beacon messages can include circuitry configured to receive beacon messages from multiple beacon devices over short-range communication links, the beacon devices being within a vicinity of an establishment, the beacon messages being configured to provide content associated with the establishment; and a processor configured to perform operations. The operations can include determining priorities of the beacon messages based on one or more criteria; selecting a beacon message of the beacon messages based on the priorities to produce a selected beacon message; and presenting the selected beacon message through the apparatus. The apparatus can include a screen coupled with the processor. The operations can include retrieving content corresponding to one or more values included in the selected beacon message. Presenting the selected beacon message can include displaying the retrieved content on the screen.

Particular implementations disclosed herein provide one or more of the following advantages. Prioritizing a display of beacon messages can enhance a user's experience with an application that is configured to provide an interactive experience with a beacon-equipped environment. Prioritizing a presentation of beacon messages can include filtering out low priority or irrelevant messages. Selectively waking a mobile device to present a beacon message can conserve power on the mobile device.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Figure 1:
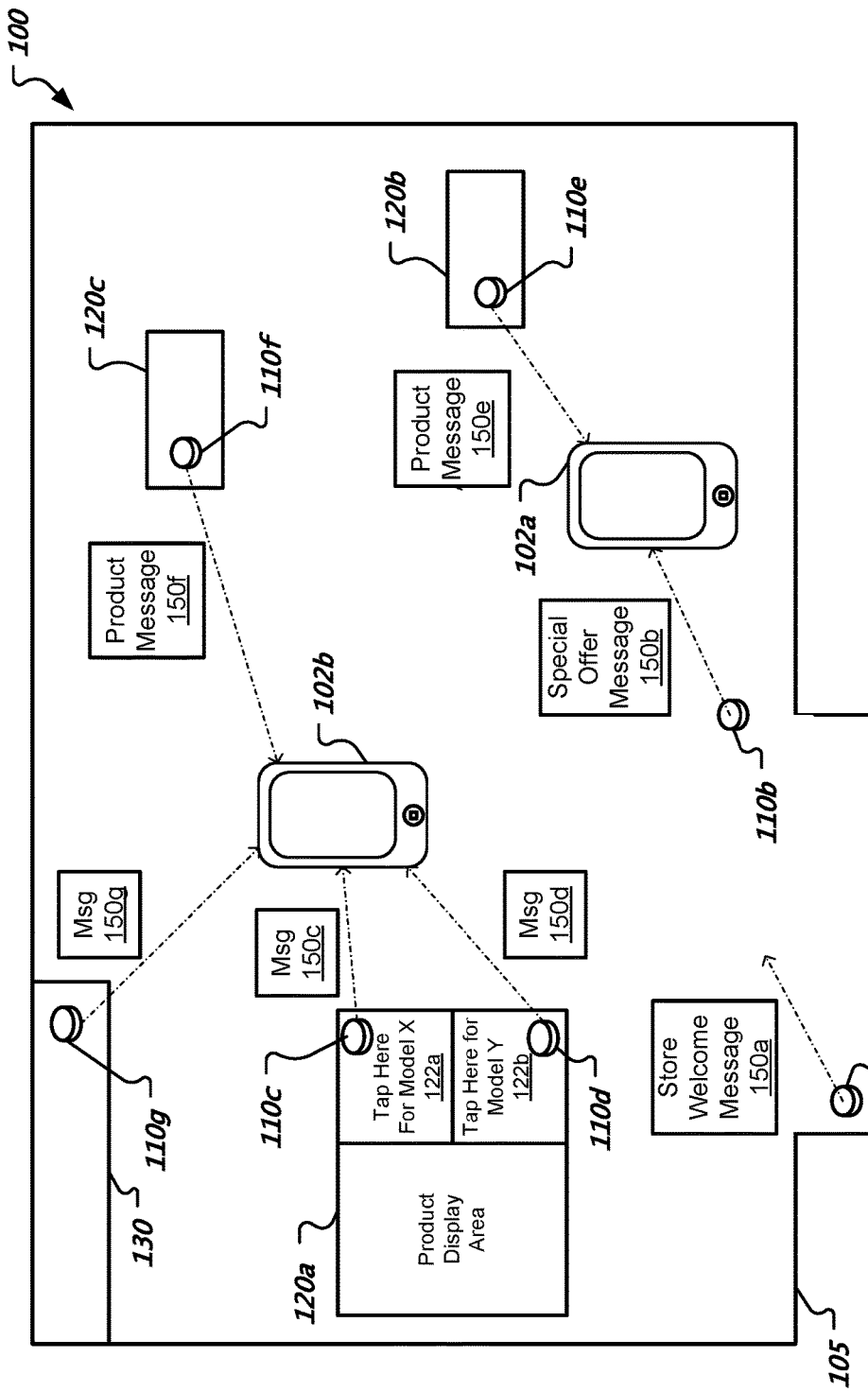
FIG. 1 is a plan view of an example operating environment.

FIG. 1 is a plan view of an example operating environment 100. In the example shown, operating environment 100 is a retail store 105 that includes beacon devices 110a-g. The beacon devices 110a-g can broadcast beacon messages 150a-g to mobile devices 102a-b using short-range communication links. On the mobile devices 102a-b, a retail store application can present the beacon messages to users of the mobile devices 102a-b to provide the users with an interactive shopping experience. Although the example environment 100 is described herein as a retail store, the described features and processes are applicable to any beacon-equipped environment, including museums, sports arenas, restaurants and the like. In some implementations, the retail store application interacts with an operating system of the mobile device to perform the various processes described herein.

The beacon devices 110a-g can be configured (locally or remotely over a network) to transmit messages that provide information related to the retail store 105 or events (e.g., advertising campaigns) occurring at the retail store 105. For example, beacon device 110a can transmit a store welcome message 150a and beacon device 110b can transmit a special offer message 150b. In some implementations, a beacon message includes a message number that the retail store application can map to content such as a text message for display on a screen of the mobile device 102a-b. In some implementations, the content (e.g., a database table) can be downloaded from a network-based server computer to the mobile device when the user first enters the retail store 105.

In some implementations, the retail store 105 can include beacon-equipped product demonstration tables 120a-c. For example, a table 120a can include a product display area and product information placards 122a-b having beacon devices 110c-d configured to broadcast respective beacon messages 150c-d corresponding to the respective products identified by the placards 122a-b. In some implementations, such beacon messages 150c-d provide additional information about the respective products. In some implementations, such beacon messages 150c-d trigger a process for the user to order or customize the product using the retail store application. In some implementations, the beacon devices 110c-d can be fixed to or embedded inside of the information placards 122a-b. If a user taps or swipes a mobile device 102a-b on or near one of the beacon devices 110c-d, thereby selecting the product model associated with the corresponding placard 122a-b, the retail store application causes a display of a message associated with the user-selected one of the placards 122a-b, i.e., beacon devices 110c-d. The retail store 105 can include additional tables 120b-c each equipped with beacon devices 110e-f that are configured to broadcast beacon messages 150e-f associated with the respective products being displayed on the tables 120b-c. Further, the retail store 105 can include a customer care center 130 that is equipped with a beacon device 110g that is configured to broadcast a beacon message 150g associated with the center 130.

The beacon devices 110a-g and the mobile devices 102a-b can use a short-range radio technology such as Bluetooth™ or a near field communication (NFC) technology for broadcasting and/or receiving beacon messages. In some implementations, the beacon devices 110a-g can use a specific type of Bluetooth™ called Bluetooth™ low energy (BLE). A wireless communication range of the beacon devices 110a-g can be between 10 to 30 meters. Other ranges are possible. When a mobile device 102a-b is within a wireless communication range of a beacon device 110a-g, it can receive a corresponding beacon message.

Various examples of mobile devices 102a-b include smartphones, tablet computers, notebook computers, or wearable computers. In some implementations, the mobile devices 102a-b can include a wireless receiver or transceiver that can scan the environment 100 for beacon messages from other devices, such as beacon devices 110a-g, in the environment 100. For example, a mobile device 102a-b can include a BLE receiver that scans for beacon messages. The mobile devices 102a-b can communicate with servers using a base station of a wireless network such as one based on Long Term Evolution (LTE) or Code Division Multiple Access (CDMA), e.g., CDMA2000 and Wideband CDMA (WCDMA). Other types of wireless networks are possible. In some implementations, a mobile device 102a-b can be configured to be a beacon device.

Figure 2A:
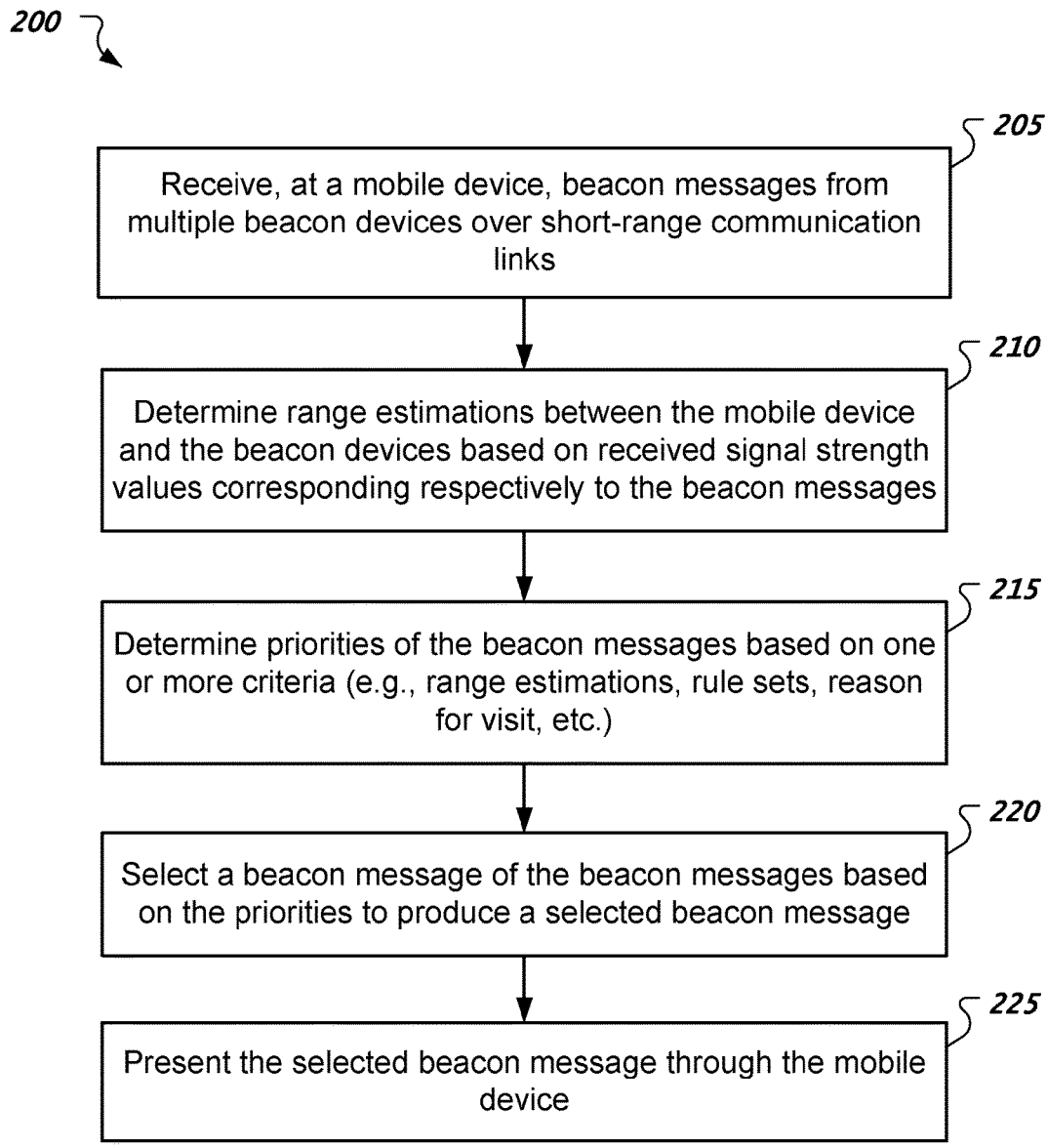
FIG. 2A illustrates an example process performed by a mobile device to prioritize beacon messages for presentation.

FIG. 2A illustrates an example process 200 performed by a mobile device to prioritize beacon messages for presentation. In some implementations, the process 200 can begin by receiving, at a mobile device, beacon messages from multiple beacon devices over short-range communication links (205). In some implementations, the process 200 can include activating a scan for beacon messages from beacon devices that are in the vicinity of the mobile device. As used herein, "in the vicinity" means the mobile device is physically close enough to the beacon device to receive RF signals transmitted by the beacon device. For example, a wireless transceiver on the mobile device can initiate a short-range scan for RF signals such as BLE RF signals or NFC RF signals.

The process 200 can estimate the range between the mobile device and each beacon device in communication with the mobile device based on received signal strength values corresponding respectively to the beacon messages (210). In some implementations, process 200 collects RF signal measurements associated with the beacon messages and computes RSSI values for each of the beacon messages. In some implementations, an RSSI can be mathematically defined as being approximately a ratio of the power of a received signal and a reference received power (e.g., 1 mW), where the higher the RSSI number (or less negative) the stronger the signal. In some implementations, a RSSI value can be expressed in dBm. Based on a predetermined transmission power for transmitting beacon messages, range estimation can be computed based on the RSSI value. Determining range estimations can include using channel quality information such as a bit error rate (BER) or a packet error rate (PER) derived from a received beacon message.

The process 200 can determine priorities of the beacon messages based on one or more criteria (215). Various examples of criteria include but are not limited to: proximity-based criteria; context-based criteria; content-based criteria; and timing criteria. Other types of criteria are possible. In some implementations, priorities can be stored as numerical values, where higher values correspond to higher priorities. In some implementations, determining priorities can include assigning beacon messages to priority classes such as high priority, intermediate priority, and low priority. More or fewer priority classes can be used as needed for an application. In some implementations, a priority class can include two or more subclasses to provide additional priority granularity. In some implementations, determining priorities of the beacon messages can include ordering beacon messages in a queue such that the highest priority message is at the top of the queue. In some implementations, beacon messages that are determined to have a priority not exceeding a minimum priority threshold can be deleted.

In some implementations, determining the priorities (215) can include using the range estimations such that a message from a beacon device that is closer to the mobile device has a higher priority than a message from a beacon device that is farther away from the mobile device. In some implementations, determining the priorities can include applying one or more rule sets to the beacon messages to compute priority values. In some implementations, a rule set can be selected based on a reason for a visit to the retail store, such as to pick up an earlier placed order or to have a consultation with a store employee.

The process 200 can select a beacon message of the beacon messages based on the priorities to produce a selected beacon message (220). Selecting a beacon message can include determining the highest priority of the priorities and selecting a beacon message of the beacon messages that corresponds to the highest priority. In some implementations, selecting a beacon message can include selecting a message at the top of a message queue that is organized by message priority. In some implementations, the process 200 can select multiple beacon messages for display and place them in order of priority in a display stack data structure, where the top of the display stack is the highest priority message and is displayed first.

The process 200 can present the selected beacon message through the mobile device (225). Presenting the selected beacon message can include displaying information corresponding to the selected beacon message on a screen of the mobile device. In some implementations, the process 200 can select multiple beacon messages for display and create a prioritized display order. In some implementations, displaying information can include displaying a first one of multiple beacon messages based on the prioritized display order, and later displaying a second one of multiple beacon messages that has a lower priority than the previously displayed message. In some implementations, the second one is displayed after the first one has been dismissed or acknowledged. In some implementations, the process 200 can provide one or more notifications associated with the selected beacon message. An indication can include a force feedback (e.g., vibration indication), audio indication (e.g., beep, music, etc.), visual indication (e.g., flashing light), or a combination thereof. In some implementations, beacon messages can include any content including but not limited to: text, graphics, digital images, audio, video and animation. Beacon messages can be presented on the mobile device in the form of audio output to work with mobile devices without display capability or to assist visually impaired users. In some implementations, presenting the selected beacon message can include retrieving content corresponding to one or more values included in the selected beacon message; and displaying the content on the screen.

Figure 2B:
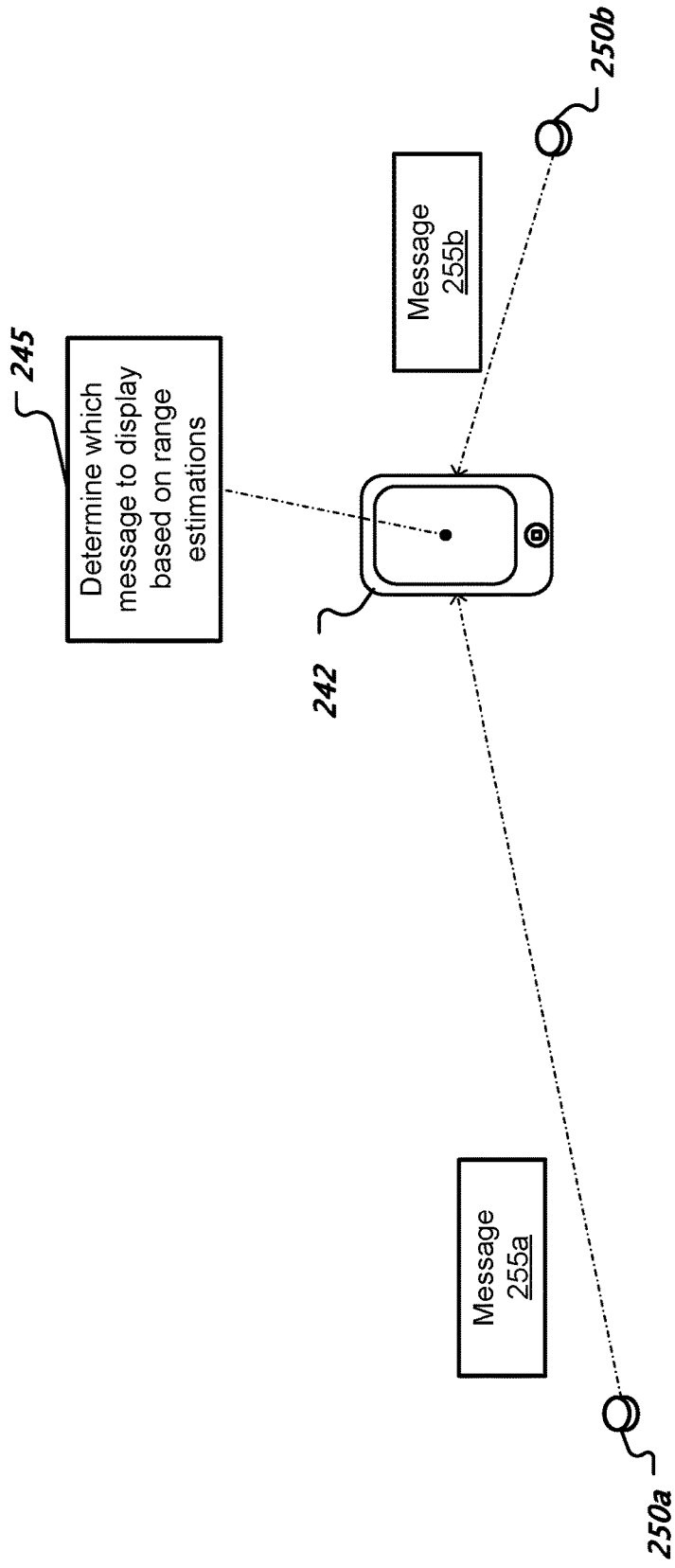
FIG. 2B illustrates an example of proximity-based message priority determination performed by a mobile device.

FIG. 2B illustrates an example of proximity-based message priority determination performed by a mobile device. Proximity to a beacon device can be used as criteria to determine beacon message priorities. In this example, a mobile device 242 is receiving first messages 255a from a first beacon device 250a and second messages 255b from a second beacon device 250b. In some implementations, the beacon devices 250a-b can be configured to broadcast messages at periodic time intervals, e.g., every 50 milliseconds. Since, in this example, the mobile device 242 is closer to the second beacon device 250b, the received signal from that beacon device 250b is typically stronger than a signal from a beacon device 250a that is farther away assuming that both beacon devices 250a-b transmit at the same power level. Accordingly, range estimations can be computed based on RSSI values associated with the beacon messages 255a-b. The mobile device 242 can be configured to determine which message of the messages 255a-b to display based on range estimations (245). Determining which message to display can include mapping the range estimations to priority values and selecting the message with the highest priority value.

In some implementations, the mobile device 242 can be configured to provide a range class for a received beacon message that can be used by an application that needs to know at least an approximate distance between a mobile device and an RF signal source, such as a beacon device. Determining range estimations can include assigning range classes to received beacon messages. For example, RSSI values associated with received beacon messages can be assigned to range classes based on RSSI thresholds without converting the RSSI values to distances. In some implementations, range classes include: Immediate, Near, Far, and Unknown. More or fewer range classes can be used as needed for an application. For example, the Immediate range class can be defined as a range between a mobile device and a RF signal source that is, e.g., 0 to 30 centimeters. The Near range class can be defined as a range between a mobile device and a RF signal source that is, e.g., 30 centimeters to 4 meters. The Far range class can be defined as a range between a mobile device and a RF signal source that is, e.g., 4 to 30 meters. The Unknown range class can be defined as the range between a mobile device and a signal source (e.g., greater than 30 meters). Distance thresholds can separate the range classes. The distance thresholds (e.g., in meters) can be converted to RSSI thresholds in dBm to enable classification of RSSI values, where the range classes are separated by RSSI thresholds. In some implementations, the mobile device 242 can be configured to assign priority classes to the beacon messages 255a-b based on their correspondingly assigned range classes. For example, a high priority class can be assigned to a message in an Immediate range class, whereas a low priority class can be assigned to a message in a Far range class.

Figure 2C:
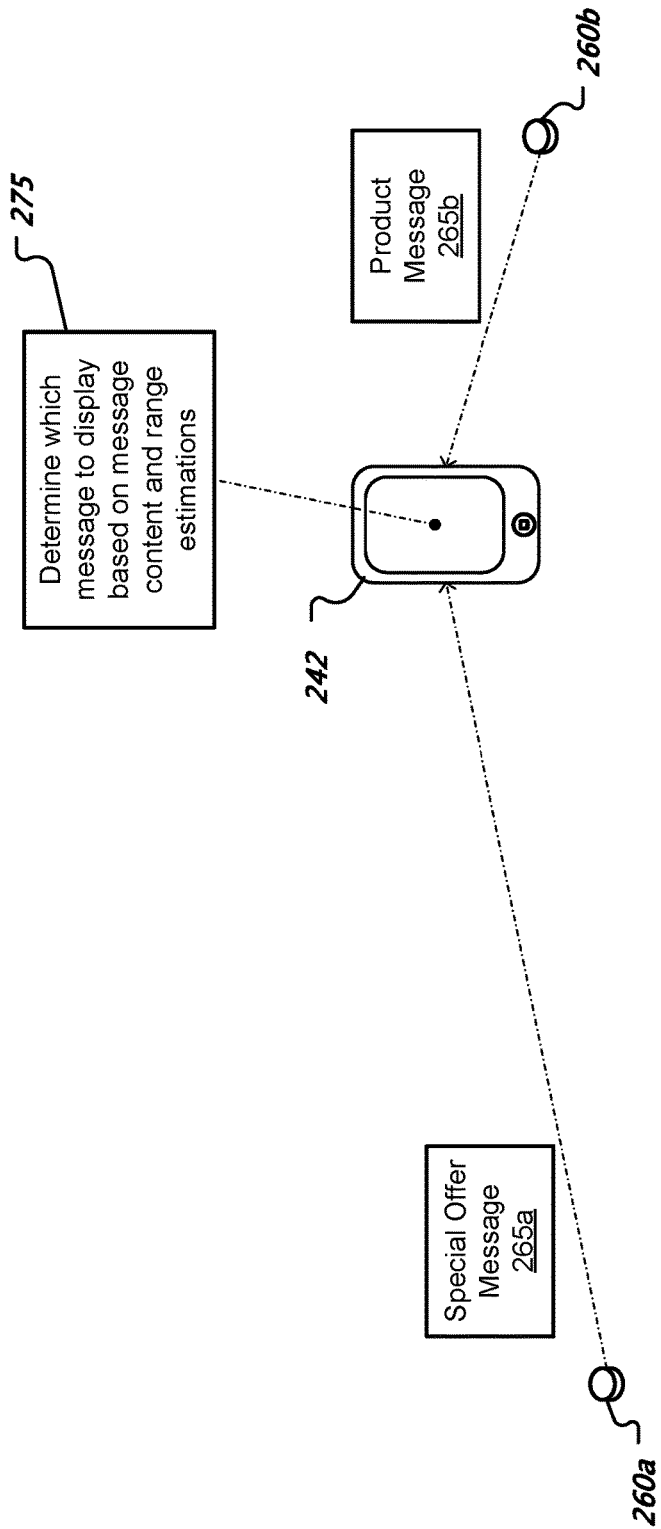
FIG. 2C illustrates an example of content-based message priority determination performed by a mobile device.

FIG. 2C illustrates an example of content-based message priority determination performed by a mobile device. Beacon message content in addition to proximity to a beacon device can be used as criteria to determine beacon message priorities. In this example, a mobile device 242 is receiving special offer messages 265a from a beacon device 260a and product messages 265b from another beacon device 260b. In some implementations, the beacon devices 260a-b can be configured to broadcast messages at periodic intervals. The mobile device 242 can be configured to determine which message of the messages 265a-b to display based on message content and range estimations (275). In some implementations, determining which message to display can include applying a rule set such as a content preference ordering list to the messages 265a-b to determine respective priority values. In some implementations, content-based message priority determination can be performed after collecting beacon messages in a predetermined time period. In some implementations, if duplicate messages are received within the predetermined time period, the mobile device 242 can store a single copy of the duplicate messages and determine a priority value for the single copy.

In some implementations, assuming that the received signal strength values of both messages 265a-b are above a minimum threshold, the mobile device 242 can use beacon message content (e.g., a message type) to override an initial determination of message priority that is based strictly on proximity. For example, if special offer messages have a higher priority than product information messages, then the special offer message 265a can be selected for display over the product information message 265b even though the product information message 265b is coming from a beacon device 260b that is closer to the mobile device 242.

In some implementations, the mobile device 242 can run a retail store application that uses one or more content based rule sets, one or more user configurable content based priority settings, or a combination thereof. For example, a user configurable content based priority setting can set a special offer message type to have a higher priority than other message types such as a product information message type. In some implementations, if a tie occurs in proximity-based message priority determination (e.g., two or more beacon messages are assigned to the same range class), then a content-based message priority determination can be performed to break the tie.

Figure 3A:
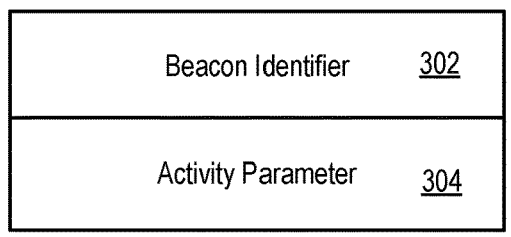
FIGS. 3A, 3B, and 3C illustrate different examples of beacon message formats.
Figure 3B:
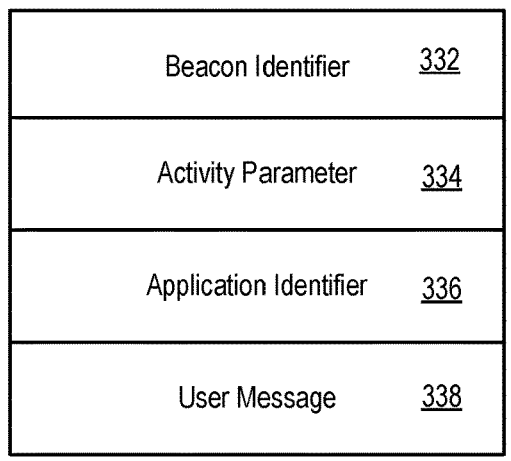
Figure 3C:
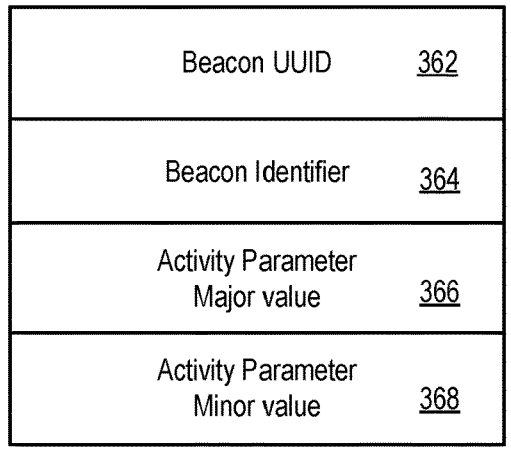

FIGS. 3A, 3B, and 3C illustrate different examples of beacon message formats. In FIG. 3A, the format 300 includes a beacon identifier 302 and an activity parameter 304. A beacon identifier 302 can include a text string such as "com.company.retailstore_no_3954" or a hexadecimal value such as "0x0e33de54." Other types of identifiers are possible. In some implementations, the activity parameter 304 can include an action value or string. In some implementations, the activity parameter 304 can include a message value or string. Other types of activity parameters are possible.

In FIG. 3B, the format 330 includes a beacon identifier 332, activity parameter 334, application identifier 336, and a user message 338. The application identifier 336 can identify an application running on the mobile device for handling the beacon message upon reception at a mobile device. For example, an operating system running on the mobile device can use the application identifier 336 to forward the beacon message to an application corresponding to the application identifier 336. In some implementations, if the application is not already installed on the mobile device, a browser can be launched on the mobile device and direct the user (e.g., using a URL) to a website where the user can download and install the application corresponding to the application identifier 336. In some implementations, the application can be downloaded automatically without user intervention in a manner that is transparent to the user (e.g., as a background process). In some implementations, if the application is installed but not running on the mobile device, the application can be launched automatically by the operating system running on the mobile device to receive the beacon message.

In FIG. 3C, the format 360 includes a beacon universally unique identifier (UUID) 362, beacon identifier 364, activity parameter major value 366, and activity parameter minor value 368. A venue can include multiple beacon devices having the same beacon identifier 364. However, such beacons can have different values for the beacon UUID 362. Thus, the beacon UUID 362 can serve to differentiate among beacon devices sharing the same beacon identifier 364. In some implementations, the beacon identifier 364 includes the beacon UUID 362. In some implementations, the UUID 362 is a 128-bit value.

An activity parameter can be split between a major value 366 and a minor value 368. In some implementations, the major value 366 and a minor value 368 are different 16-bit portions of a 32-bit value. In some implementations, the minor value 368 specifies a subtype from a group associated with the major value 366. For example, the major value 366 can specify a value associated with displaying user messages, and the minor value 368 can specify which user message to display.

In some implementations, an application running on a mobile device can process the major value 366 and the minor value 368 based on an internal database that associates major and minor values with specific actions. In some implementations, the internal database includes information from a JavaScript Object Notation (JSON) based file or data stream containing attribute—value pairs, e.g., one or more records containing a beacon identifier, major value, minor value, and an action-response such as a text string for displaying to a user. For example, a JSON based file can include the following text:

```
{
    "beaconUUID": "B3F56DB5-EFFB-58D2-C060-C0F5F81096E5",
    "beaconIdentifier": "com.retailstore_no_3954",
    "beacons": [{
        "major": 1,
        "minor": 99,
        "action": "message",
        "url": "",
        "message": {
            "en": "Welcome to the Store!"}
    }, {
        "major": 3,
        "minor": 2,
        "action": "url",
        "url": "https://retailstore.com/us/modelx-info",
        "message": {
            "en": "Interested in the Model X? Click on link for more information"}
    }]
}
```

This example JSON file snippet includes different actions associated with different major and minor values for a beacon UUID and identifier pair. Based on receiving a major and minor value from the beacon device associated with the beacon UUID and identifier pair, a mobile device would perform the action associated with the corresponding major and minor value entry within the JSON file.

Figure 4:
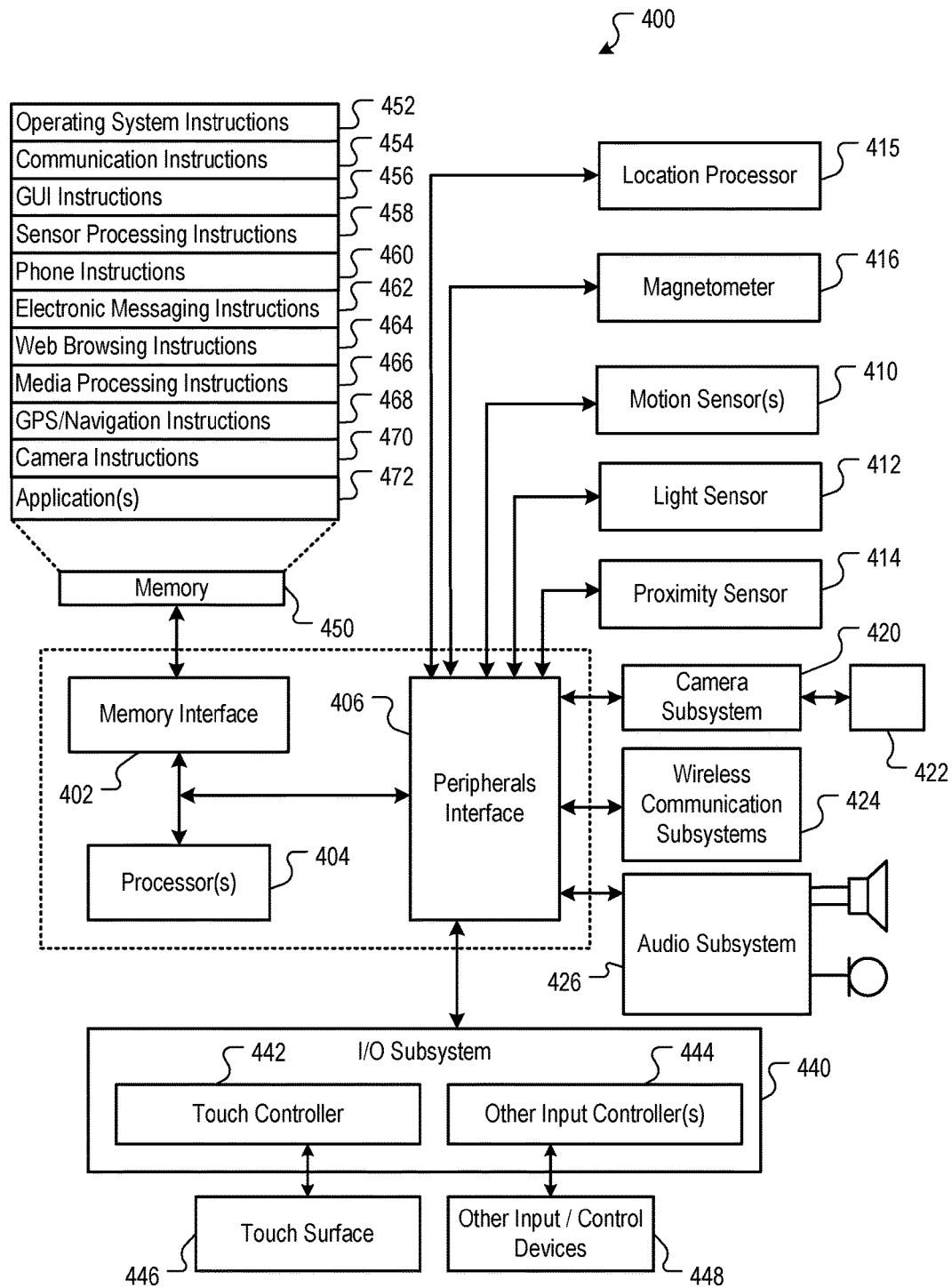
FIG. 4 is a block diagram of example mobile device architecture.

FIG. 4 is a block diagram of example mobile device architecture. The architecture may be implemented in any device 400 for generating the features described in this specification, including but not limited to portable computers, smart phones and electronic tablets, game consoles, wearable devices and the like. Device 400 may include memory interface 402, data processor(s), image processor(s) or central processor(s) 404, and peripherals interface 406. Memory interface 402, processor(s) 404 or peripherals interface 406 may be separate components or may be integrated in one or more integrated circuits. One or more communication buses or signal lines may couple the various components.

Sensors, devices, and subsystems may be coupled to peripherals interface 406 to facilitate multiple functionalities. For example, motion sensor 410, light sensor 412, and proximity sensor 414 may be coupled to peripherals interface 406 to facilitate orientation, lighting, and proximity functions of the device. For example, in some implementations, light sensor 412 may be utilized to facilitate adjusting the brightness of touch surface 446. In some implementations, motion sensor 410 (e.g., an accelerometer, gyros) may be utilized to detect movement and orientation of the device. Accordingly, display objects or media may be presented according to a detected orientation (e.g., portrait or landscape). Other sensors may also be connected to peripherals interface 406, such as a temperature sensor, a biometric sensor, or other sensing device, to facilitate related functionalities. Location processor 415 (e.g., GPS receiver chip)

may be connected to peripherals interface 406 to provide geo-positioning. Electronic magnetometer 416 (e.g., an integrated circuit chip) may also be connected to peripherals interface 406 to provide data that may be used to determine the direction of magnetic North. Thus, electronic magnetometer 416 may be used as an electronic compass. Camera subsystem 420 and an optical sensor 422, e.g., a charged coupled device (CCD) or a complementary metal-oxide semiconductor (CMOS) optical sensor, may be utilized to facilitate camera functions, such as recording photographs and video clips. Audio subsystem 426 may be coupled to a speaker 428 and one or more microphones 430 to facilitate voice-enabled functions, such as voice recognition, voice replication, digital recording, and telephony functions.

Communication functions may be facilitated through one or more communication subsystems 424. Communication subsystems 424 may include one or more wireless communication subsystems. Wireless communication subsystems 424 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystems 424 may depend on the communication network(s) or medium(s) over which the device 400 is intended to operate. For example, a device may include wireless communication subsystems designed to operate over LTE, GSM, a GPRS network, an enhanced data GSM environment (EDGE) network, 802.x communication networks (e.g., Wi-Fi, Wi-Max), CDMA networks, NFC and a Bluetooth™ network. Communication subsystems 424 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

I/O subsystem 440 may include touch controller 442 and/or other input controller(s) 444. Touch controller 442 may be coupled to a touch surface 446. Touch surface 446 and touch controller 442 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 446. In one implementation, touch surface 446 may display virtual or soft buttons and a virtual keyboard, which may be used as an input/output device by the user.

Other input controller(s) 444 may be coupled to other input/control devices 448, such as one or more buttons, rocker switches, thumb-wheel, infrared port, USB port, and/or a pointer device such as a stylus. The one or more buttons (not shown) may include an up/down button for volume control of speaker 428 and/or microphone 430.

In some implementations, device 400 may present recorded audio and/or video files, such as MP3, AAC, and MPEG video files. In some implementations, device 400 may include the functionality of an MP3 player and may include a pin connector for tethering to other devices. Other input/output and control devices may be used.

Memory interface 402 may be coupled to memory 450. Memory 450 may include high-speed random access memory or non-volatile memory, such as one or more magnetic disk storage devices, one or more optical storage devices, or flash memory (e.g., NAND, NOR). Memory 450 may store operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 may include a kernel (e.g., UNIX kernel).

Memory 450 may also store communication instructions 454 to facilitate communicating with one or more additional devices. Communication instructions 454 may also be used to select an operational mode or communication medium for use by the device, based on a geographic location (obtained by the GPS/Navigation instructions 468) of the device. Memory 450 may include graphical user interface instructions 456 to facilitate graphic user interface processing, including a touch model for interpreting touch inputs and gestures; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes; camera instructions 470 to facilitate camera-related processes and functions; and application storage 472 for storing applications, such as a retail store application that is configured to receive and prioritize beacon messages. In some implementations, such applications can be pre-installed on the device 400, downloaded from an application store server, or a combination thereof. The retail store application can include a rules-based engine that processes beacon messages according to rule sets, as described in reference to FIGS. 1-3 and 5-9.

Each of the above identified instructions and applications may correspond to a set of instructions for performing one or more functions described above. These instructions need not be implemented as separate software programs, procedures, or modules. Memory 450 may include additional instructions or fewer instructions. Furthermore, various functions of the device may be implemented in hardware and/or in software, including in one or more signal processing and/or application specific integrated circuits (ASICs).

Figure 5:
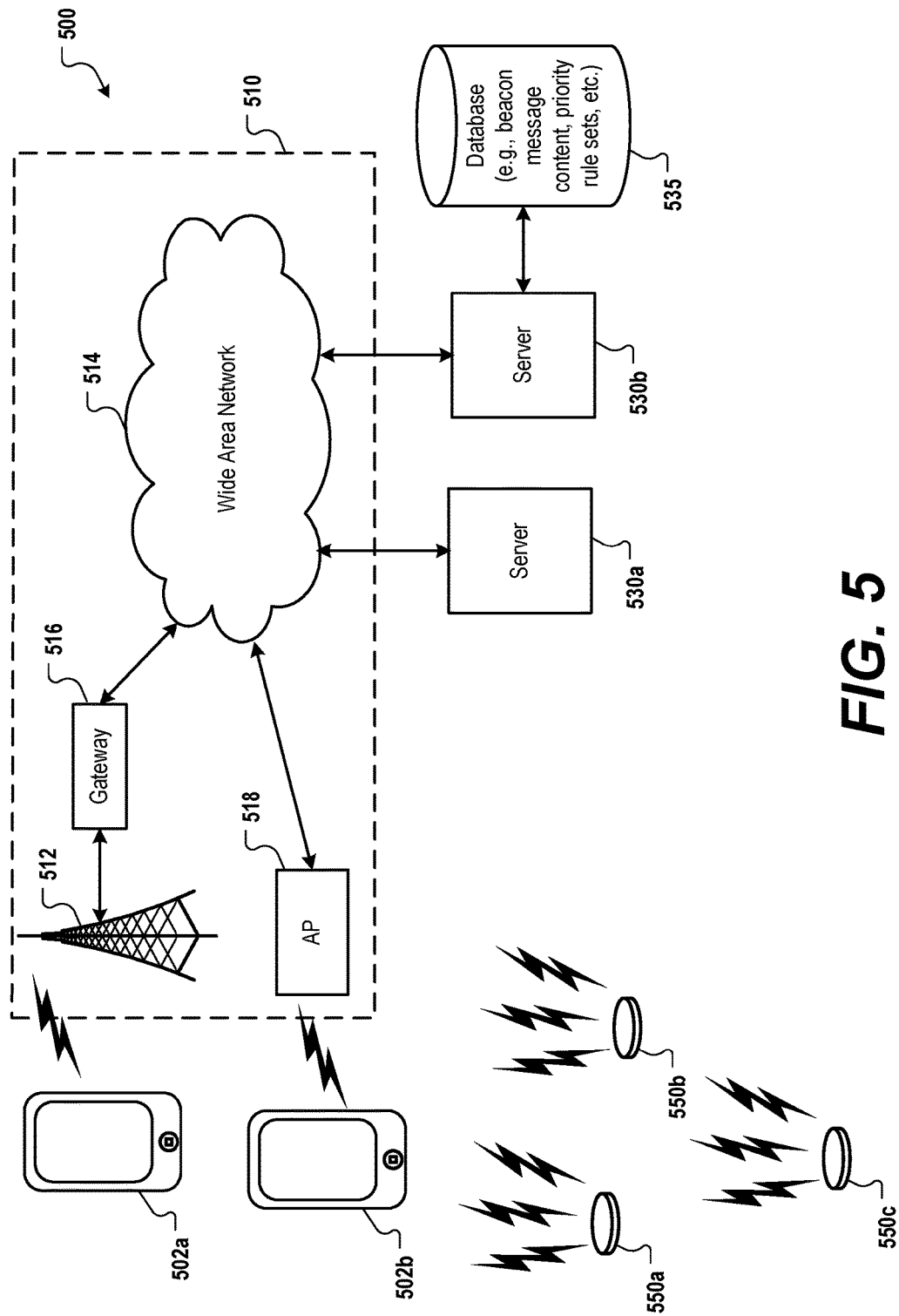
FIG. 5 illustrates an example operating environment for prioritizing beacon messages.

FIG. 5 illustrates an example operating environment for prioritizing beacon messages. Mobile devices 502*a-b*, for example, can communicate over one or more wireless networks. For example, a base station 512 of a wireless network, e.g., a cellular network, can communicate with a wide area network (WAN) 514, such as the Internet, by use of a gateway 516. Likewise, an access point (AP) 518, such as an IEEE 802.11 family based wireless access point, can provide communication access to the wide area network 514. The mobile device 502*a-b* can, for example, communicate with one or more servers 530*a-b* via the base station 512, access point 518, or combination thereof. The servers 530*a-b* can include a network interface configured to communicate with devices such as the mobile devices 502*a-b*. The servers 530*a-b* can include processor electronics configured to communicate with devices such as the mobile devices 502*a-b* via the network interface using a protocol such as Transmission Control Protocol/Internet Protocol (TCP/IP) or User Datagram Protocol (UDP).

Mobile devices 502*a-b* can also receive beacon messages over a short-range communication link from a beacon device 550*a-c*. In some implementations, the short-range communication link can be based on Bluetooth radio technology. In some implementations, the short-range communication link can be based on NFC radio technology. In some implementations, the mobile devices 502*a-b* can be configured to continuously scan for beacon messages. In some implementations, the mobile devices 502*a-b* can be configured to scan for beacon messages for a predetermined time period based on an application invoking a beacon scan API. Based on receiving one or more beacon messages over short-range communication links from one or more beacon devices 550*a-c*, the mobile devices 502*a-b* can determine beacon message priorities.

In some implementations, based on receiving a beacon message over a short-range communication link from a beacon device 550*a-c*, the mobile devices 502*a-b* can establish communications with one or more servers 530*a-b* via a long-range communication link associated with a base station 512 that provides cellular data services. For example, a beacon message from a beacon device 550*a-c* can cause the mobile devices 502*a-b* to retrieve a retail store application from a first server 530*a*. In some implementations, the mobile devices 502*a-b* have already retrieved and are running the retail store application before receiving the beacon message from the beacon device 550*a-c*. The retail store application can be configured to download beacon message content from a second server 530*b*. In some implementations, the retail store application can download beacon message content from the second server 530*b* in response to an initial reception of a beacon message such as a welcome message. Further, the retail store application can be configured to download one or more priority rule sets from the second server 530*b*. The priority rule sets can be used to determine beacon message priorities.

In some implementations, the second server 530*b* can store data such as beacon message content and priority rule sets in a database 535. In some implementations, the beacon message content includes mappings between beacon message values (e.g., identifier, major, and/or minor values) and corresponding message data (e.g., text, picture, video, and/or audio). After downloading the beacon message content from the second server 530*b*, the mobile devices 502*a-b* can use the mappings and message texts to translate a received beacon message into a format that is suitable for display to users of the mobile devices 502*a-b*. In some implementations, beacon message content can be stored as a document within the database 535 such as an Extensible Markup Language (XML) document or a JSON document. Other document types are possible. In some implementations, the second server 530*b* provides the entire beacon message content document to the mobile devices 502*a-b*. In some implementations, priority rule sets can be stored as a document within the database 535 such as an XML document or a JSON document. Other document types are possible. In some implementations, the second server 530*b* includes processor electronics configured to store applications, including a retail store application, for download to the mobile devices 502*a-b*.

Beacon devices 550*a-c* can include circuitry such as a processor, memory, transmitter for broadcasting beacon messages, and an interface for programming the beacon devices 550*a-c*, which can be a USB interface or a two-way wireless interface such as an LTE or IEEE 802.11 based network interface. In some implementations, the beacon devices 550*a-c* can be programmed to periodically update data within the beacon messages. The beacon device 550*a-c* can transmit different action codes, e.g., different message values, at different times during the day. Such codes, for example, can include a first message value for announcing an in-store event that starts in 15 minutes, and for after the event, a second message value for retrieving product information for a product featured during the in-store event.

Figure 6:
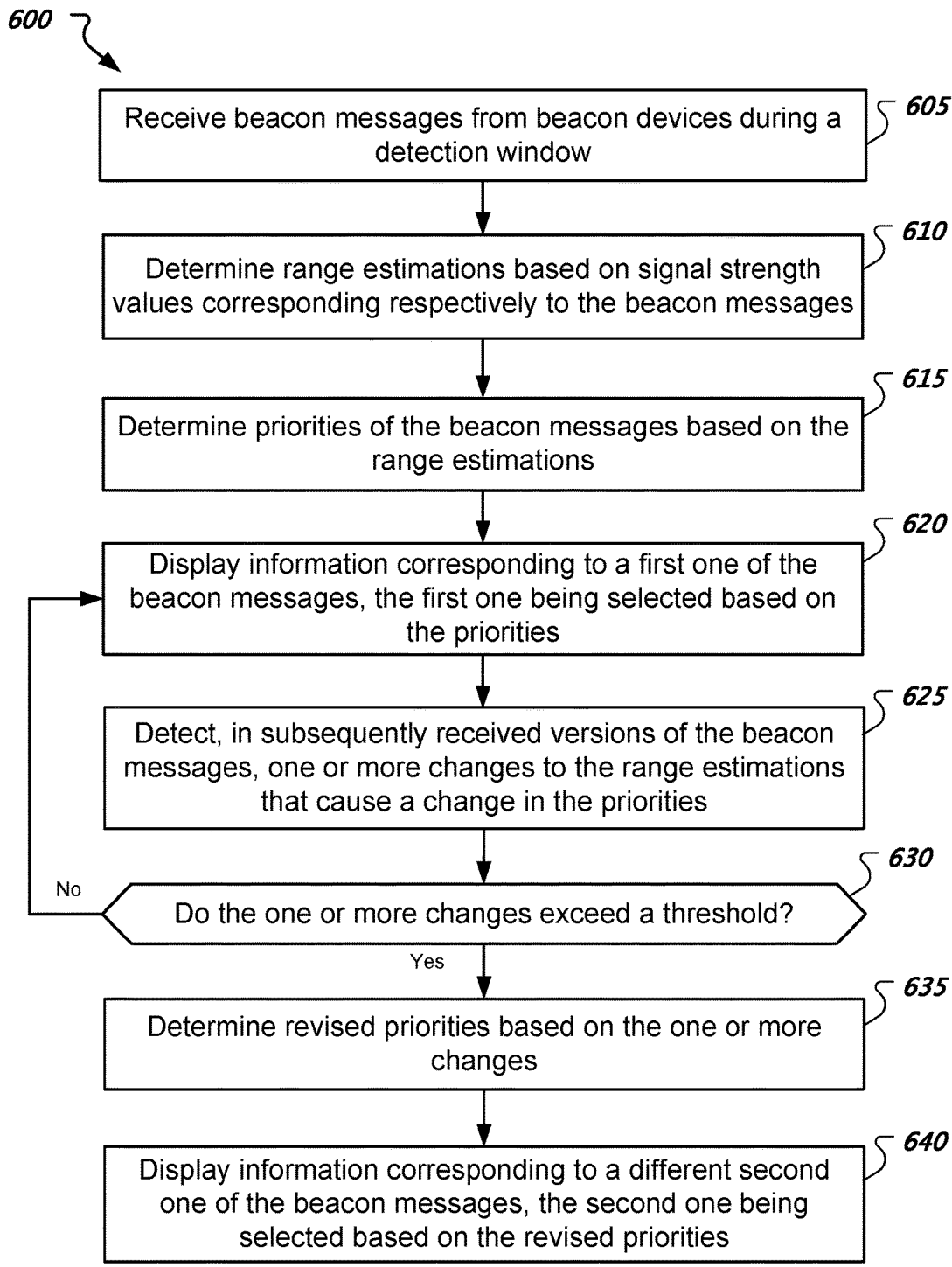
FIG. 6 illustrates an example process performed by a mobile device that performs beacon message prioritization based on message hysteresis.

FIG. 6 illustrates an example process 600 performed by a mobile device that performs beacon message prioritization based on message hysteresis. The process 600 uses hysteresis or "stickiness" to prevent changes in priorities determined for received beacon messages that are due to transitory fluctuations in received signal strength values associated with the received beacon messages. For example, a temporary signal fade may occur due to signal absorption caused by a body moving around a beacon device, such a fade may cause a change to a range estimation, i.e., the fade would likely cause an increase in the range estimation. Using hysteresis can smooth out these fluctuations.

The process 600 receives beacon messages from beacon devices during a detection window (605). In some implementations, a duration of the detection window is based on a predetermined value such as 10 milliseconds, 50 milliseconds, etc. In this example, multiple different types of beacon messages are being received from the beacon devices. In more detail, receiving beacon messages can include receiving multiple first beacon messages, all having the same first information content that is represented by a first message value, from a first beacon device; and receiving multiple second beacon messages from a second beacon device, the second beacon messages all having the same second information content that is represented by a second message value.

The process 600 determines range estimations based on signal strength values corresponding respectively to the beacon messages (610). In some implementations, the process 600 can include averaging two or more received signal strength values corresponding to at least a portion of the first beacon messages from the first beacon device that have been received in the detection window, and averaging two or more received signal strength values corresponding to at least a portion of the second beacon messages from the second beacon device that have been received in the detection window. Determining the range estimations can include using averaged received signal strength values.

The process 600 determines priorities of the beacon messages based on the range estimations (615). Determining the priorities can include assigning priorities based on the range estimations such that a message from a beacon device that is determined to be closer to the mobile device has a higher priority than a message from a beacon device that is determined to be farther away from the mobile device. The process 600 displays information corresponding to a first one of the beacon messages, the first one being selected based on the priorities (620).

The process 600 detects, in subsequently received versions of the beacon messages, one or more changes to the range estimations that cause a change in the priorities (625). Note that the subsequently received versions can be received during a subsequent detection window. The process 600 determines whether the one or more changes exceed a threshold (630). If the one or more changes do not exceed the threshold, the same information is continued to be displayed (620). If the one or more changes do exceed the threshold, the process 600 determines revised priorities based on the one or more changes (635). The process 600 displays information corresponding to a different second one of the beacon messages, the second one being selected based on the revised priorities (640).

Figure 7:
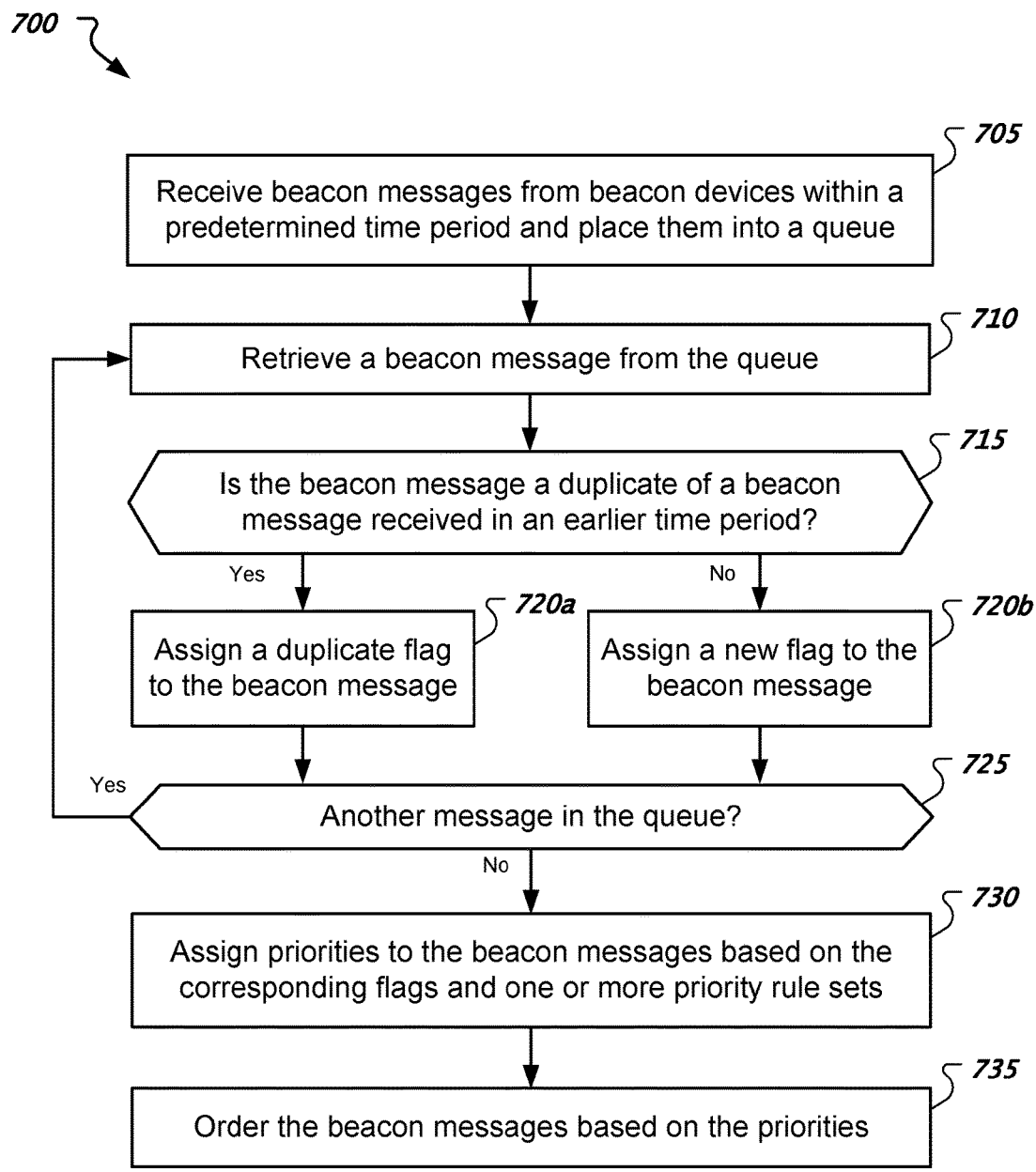
FIG. 7 illustrates an example process performed by a mobile device that performs beacon message prioritization based on new and duplicate message flags.

FIG. 7 illustrates an example process 700 performed by a mobile device that performs beacon message prioritization based on new and duplicate message flags. The process 700 receives beacon messages from beacon devices within a time period (e.g., predetermined time period) and places them into a queue (705). The process 700 retrieves a beacon message from the queue (710). The process 700 determines whether the beacon message is a duplicate of a beacon message received in an earlier time period (715). If it is a duplicate the process 700 assigns a duplicate flag to the beacon message (720*a*), otherwise the process 700 assigns a new flag to the beacon message (720*b*). The process 700 determines whether there is another message in the queue (725), if so the process 700 loops and retrieves another beacon message from the queue (710) and continues. If not, the process 700 assigns priorities to the beacon messages based on the corresponding flags and one or more priority rule sets (730). The process 700 orders the beacon messages based on the priorities (735). Ordering the beacon messages can include sorting an array or queue containing the beacon messages based on assigned priorities.

Figure 8:
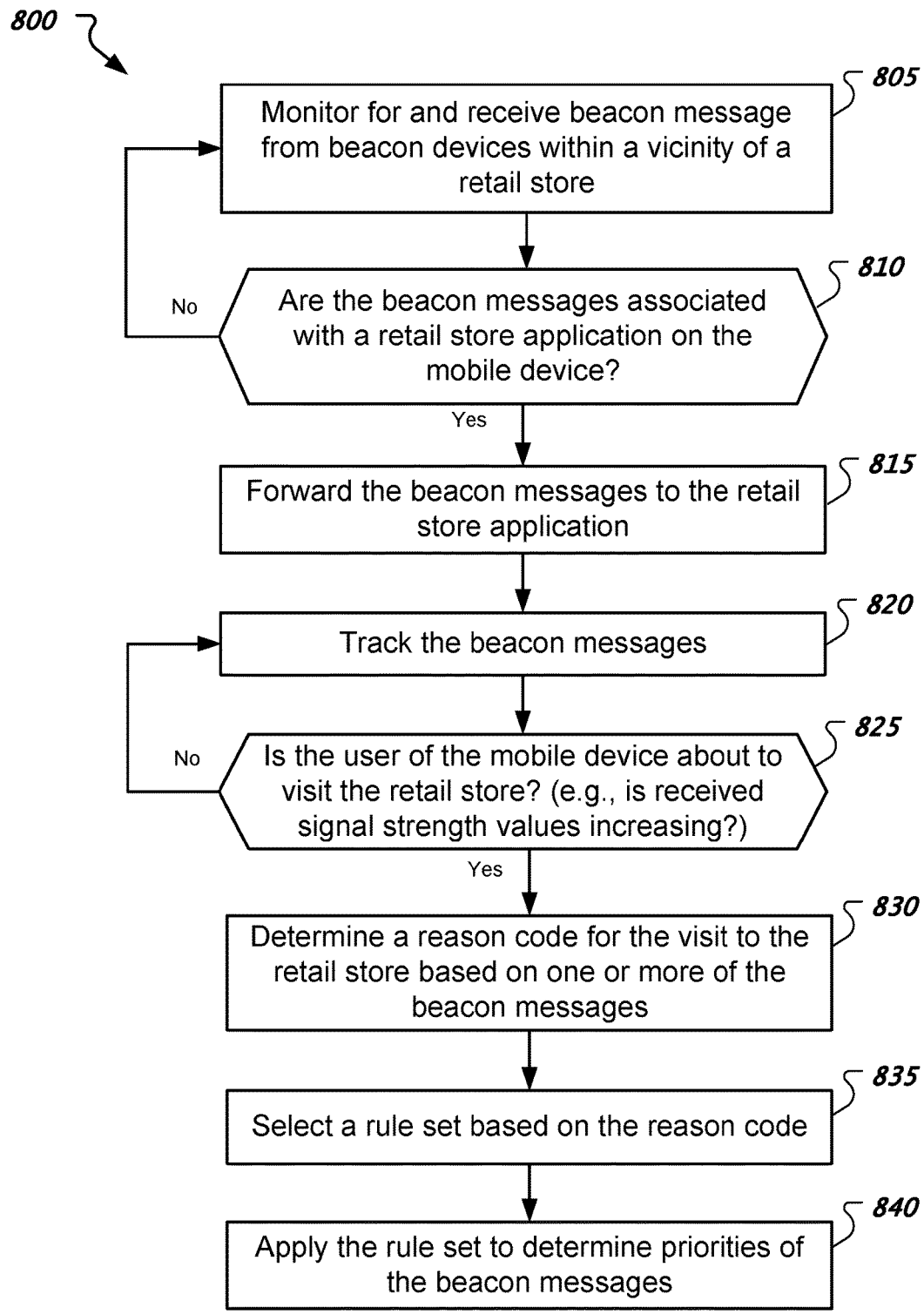
FIG. 8 illustrates an example process performed by a mobile device that performs beacon message prioritization based on a reason code.

FIG. 8 illustrates an example process 800 performed by a mobile device that performs beacon message prioritization based on a reason code. The process 800 monitors for and receives beacon message from beacon devices within a vicinity of a retail store (805). The process 800 determines whether the beacon messages are associated with a retail store application on the mobile device (810). In some implementations, this association determination is based on whether the retail store application has registered itself via an API to obtain any beacon messages received by thee mobile device. In some implementations, this association determination is based on accessing an application identifier (App ID) contained within a beacon message and determining whether the application identifier matches an application that is installed on the mobile device. If the messages are not associated, the process 800 continues to monitor for beacon messages (805). If the messages are associated, the process 800 forwards the beacon messages to the retail store application (815). In some implementations, forwarding the beacon messages can include sending a separate notification to the application for each of the beacon messages.

Within the process running the retail store application, the process 800 tracks the beacon messages (820). Tracking the beacon messages can include storing the beacon messages in a data structure such as a table, an array, queue, or linked-list. The process 800 determines whether the user of the mobile device is about to visit the retail store (825). For example, the process 800 can compare received signal strength values associated with at least a portion of the beacon messages to determine whether the received signal strength values are increasing with time, which may indicate that the user is walking towards an entrance of the retail store, the entrance being equipped with a beacon device.

If the user of the mobile device is not about to visit, the process 800 continues to track the beacon messages (820). If the user of the mobile device is about to visit, the process 800 determines a reason code for the visit to the retail store based on one or more of the beacon messages (830). In some implementations, the process 800 can access a database, such as a user's calendar database or the retail store's appointment log, to determine whether the user has an appointment at the retail store. Various examples of reason codes include codes for package pick-up, service consultation, targeted browsing, general browsing, or non-specified. Other types of codes are possible. In some implementations, a general browsing code is used as a default code.

The process 800 selects a rule set based on the reason code (835). Various examples of rule sets include a package pick-up rule set, service consultation rule set, general browsing rule set, or a non-specified visit rule set. The process 800 applies the rule set to determine priorities of the beacon messages (840). In some implementations, a rule set includes a list of message types and corresponding priority values. A package pick-up rule set, for example, can cause beacon messages associated with general solicitations such as specials of the day to have lower priority than beacon messages associated with a package pick-up such as messages that provide instructions for the pick-up. In contrast, a general browsing rule set can assign beacon messages associated with general solicitations to have higher priority than beacon messages associated with a beacon device at a package pick-up kiosk that is providing instructions about pick-up. In another example, a targeted browsing rule set, if applied, may cause a beacon message associated with a product that is on the user's wish list to have a higher priority than a beacon message associated with a product that is not on the user's wish list. In some implementations, a user's wish list is stored within a data structure managed by the retail store application.

Figure 9:
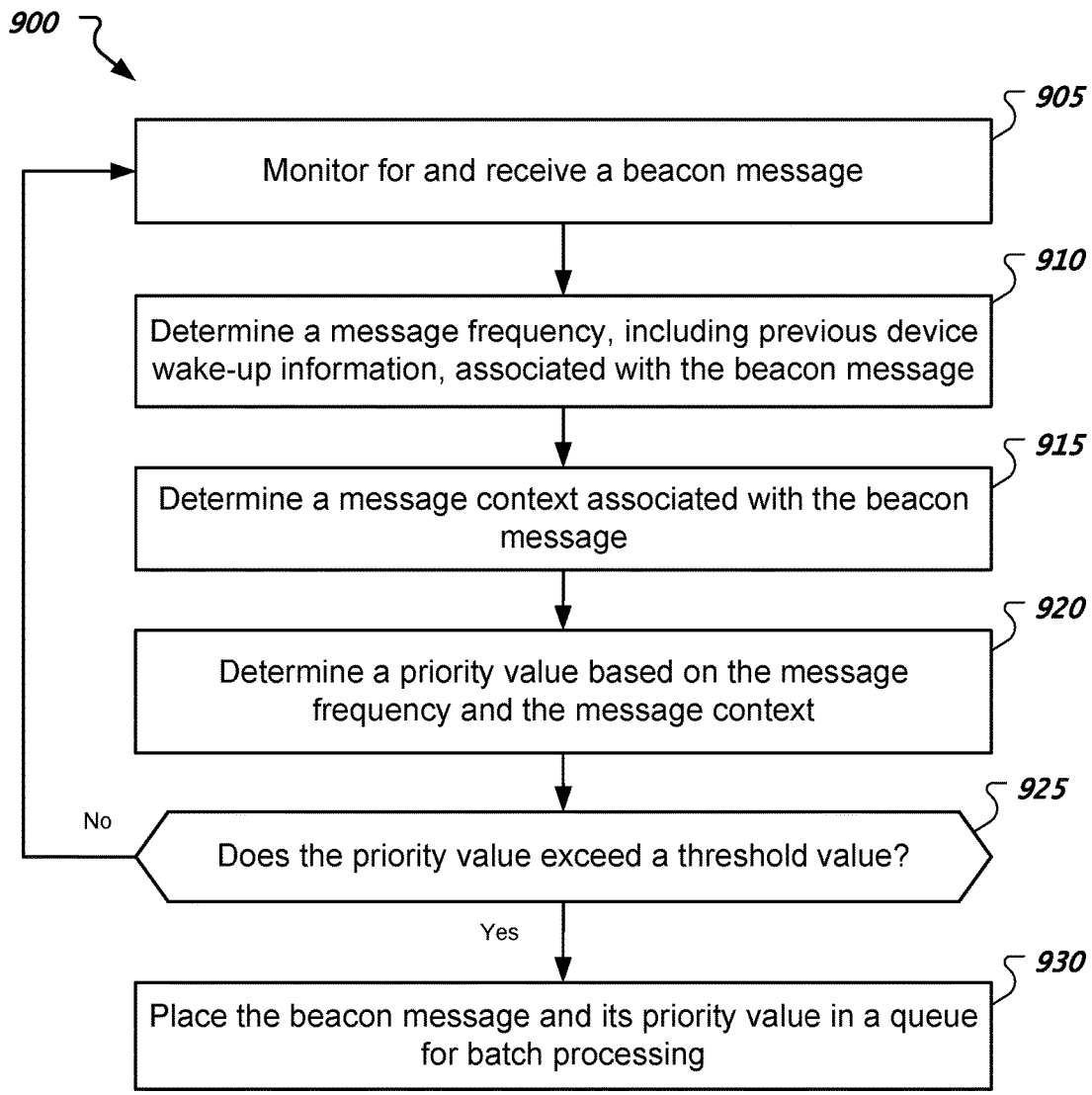
FIG. 9 illustrates an example process performed by a mobile device configured to determine priority values for beacon messages.

FIG. 9 illustrates an example process 900 performed by a mobile device configured to determine priority values for beacon messages. The process 900 monitors for and receives a beacon message (905). The process 900 determines a message frequency associated with the beacon message (910). Determining a message frequency can include determining how many times the same beacon message has been received within a time period. In some implementations, determining a message frequency can include updating a previously determined message frequency based on newly received messages. In some implementations, determining message frequency can include determining previous device wake-up information such as whether the device has been previously woken to display a previously received version of the beacon message.

The process 900 determines a message context associated with the beacon message (915). Determining a message context can include determining a reason code. In some implementations, determining a message context can include accessing a calendar stored on the mobile device. In some implementations, determining a message context can include determining whether an application such as a retail store application has been launched.

The process 900 determines a priority value based on the message frequency and the message context (920). In some implementations, a priority value can be computed based on a summation of multiple weighted components such as a context component and a frequency component. In some implementations, message context such as a reason code priority value can be a component of the priority value. For example, if a reason code indicates that the mobile device user is likely to benefit from a display of the message (e.g., the mobile device user has a scheduled appointment at the store), then assign a high context component value; otherwise, if a reason code indicates an unknown reason, then assign a low or zero context component value. In some implementations, message frequency information including previous device wake-up information can be another component of the priority value. For example, if the mobile device has already been woken to display a previously received version of the beacon message, a frequency component of the priority value can take on a low or zero value; if the mobile device has not previously received the beacon message, then the frequency component can take on a high value.

The process 900 determines whether the priority value exceeds a threshold value (925). In some implementations, the threshold value is determined based on a user-configurable parameter. If not exceeded, the process 900 continues to monitor for and receive beacon messages (905). If exceeded, the process 900 places the beacon message and its priority value in a queue for batch processing (930). In some implementations, the process 900 periodically evaluates messages in the queue, and selects the message having the highest priority value for presentation through the mobile device. In some implementations, messages with lower priority values can be presented after the message with the highest priority value has been presented. In some implementations, messages can be deleted from the queue after the process 900 evaluates the messages in the queue.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, C++, Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving, at a mobile device, beacon messages from multiple beacon devices over short-range communication links, the beacon devices being within a vicinity of an establishment, wherein the beacon messages respectively comprise beacon identifiers, wherein the beacon messages respectively provide message contents, each of the message contents being associated with the establishment;
   assigning flags to the beacon messages, each flag indicating whether a corresponding beacon message is a new message or a duplicate of a previously received beacon message;
   determining, at the mobile device, priorities of the beacon messages based on the message contents and based on a message content based priority rule set, wherein the message contents are separate from the beacon identifiers, and wherein determining the priorities comprises determining the priorities based on the flags;
   selecting, at the mobile device, a beacon message of the beacon messages based on the priorities to produce a selected beacon message; and
   presenting the selected beacon message through the mobile device.

2. The method of claim 1, comprising:
   determining range estimations between the mobile device and the beacon devices based on received signal strength values corresponding respectively to the beacon messages,
   wherein determining the priorities comprises:
      performing a proximity-based message priority determination based on the range estimations, and
      performing a content-based message priority determination based on the message content based priority rule set and one or more of the message contents.

3. The method of claim 2, wherein the proximity-based message priority determination produces a tie among two or more of the beacon messages in terms of message priority, and wherein determining the priorities comprises using the content-based message priority determination to break the tie among the two or more of the beacon messages.

4. The method of claim 1, comprising:
   determining range estimations between the mobile device and the beacon devices based on received signal strength values corresponding respectively to the beacon messages, wherein determining the priorities comprises using the range estimations such that a message from a beacon device that is closer to the mobile device has a higher priority than a message from a beacon device that is farther away from the mobile device.

5. The method of claim 1, wherein receiving the beacon messages comprises receiving first beacon messages from a first beacon device, and receiving second beacon messages from a second beacon device, and wherein determining priorities comprises using hysteresis to prevent changes in the priorities that are due to transitory fluctuations in received signal strength values associated with the first beacon messages, the second beacon messages, or both.

6. The method of claim 1, comprising:
   determining a reason code in response to a visit by a user of the mobile device to the establishment; and
   accessing a reason based rule set based on the reason code, wherein determining the priorities comprises applying the reason based rule set.

7. The method of claim 1, wherein determining the priorities comprises:
   determining whether a beacon message of the beacon messages has been previously presented to a user of the mobile device.

8. The method of claim 1, comprising:
   retrieving content corresponding to one or more values included in the selected beacon message, wherein presenting the selected beacon message comprises displaying the retrieved content on a screen of the mobile device.

9. A system comprising:
   a network interface configured to communicate with mobile devices; and
   processor electronics configured to store applications, including an application, for download to the mobile devices via the network interface,
   wherein the application comprises instructions to cause a mobile device to perform operations comprising:

receiving, at the mobile device, beacon messages from multiple beacon devices over short-range communication links, the beacon devices being within a vicinity of an establishment, wherein the beacon messages respectively comprise beacon identifiers, wherein the beacon messages respectively provide message contents, each of the message contents being associated with the establishment;

assigning flags to the beacon messages, each flag indicating whether a corresponding beacon message is a new message or a duplicate of a previously received beacon message;

determining, at the mobile device, priorities of the beacon messages based on the message contents and based on a message content based priority rule set, wherein the message contents are separate from the beacon identifiers, and wherein determining the priorities comprises determining the priorities based on the flags;

selecting, at the mobile device, a beacon message of the beacon messages based on the priorities to produce a selected beacon message; and presenting the selected beacon message through the mobile device.

10. The system of claim 9, wherein the operations comprise:

determining range estimations between the mobile device and the beacon devices based on received signal strength values corresponding respectively to the beacon messages, and wherein determining the priorities comprises:
performing a proximity-based message priority determination based on the range estimations, and
performing a content-based message priority determination based on the message content based priority rule set and one or more of the message contents.

11. The system of claim 10, wherein the proximity-based message priority determination produces a tie among two or more of the beacon messages in terms of message priority, and wherein determining the priorities comprises using the content-based message priority determination to break the tie among the two or more of the beacon messages.

12. The system of claim 9, wherein the operations comprise:

determining range estimations between the mobile device and the beacon devices based on received signal strength values corresponding respectively to the beacon messages, wherein determining the priorities comprises using the range estimations such that a message from a beacon device that is closer to the mobile device has a higher priority than a message from a beacon device that is farther away from the mobile device.

13. The system of claim 9, wherein receiving the beacon messages comprises receiving first beacon messages from a first beacon device, and receiving second beacon messages from a second beacon device, and wherein determining priorities comprises using hysteresis to prevent changes in the priorities that are due to transitory fluctuations in received signal strength values associated with the first beacon messages, the second beacon messages, or both.

14. The system of claim 9, wherein the operations comprise:

determining a reason code in response to a visit by a user of the mobile device to the establishment; and
accessing a reason based rule set based on the reason code, wherein determining the priorities comprises applying the reason based rule set.

15. The system of claim 9, wherein determining the priorities comprises:

determining whether a beacon message of the beacon messages has been previously presented to a user of the mobile device.

16. The system of claim 9, wherein the operations comprise:

retrieving content corresponding to one or more values included in the selected beacon message, wherein presenting the selected beacon message comprises displaying the retrieved content on a screen of the mobile device.

17. A mobile device comprising:

circuitry configured to receive beacon messages from multiple beacon devices over short-range communication links, the beacon devices being within a vicinity of an establishment, wherein the beacon messages respectively comprise beacon identifiers, wherein the beacon messages respectively provide message contents, each of the message contents being associated with the establishment; and a processor configured to perform operations comprising:
assigning flags to the beacon messages, each flag indicating whether a corresponding beacon message is a new message or a duplicate of a previously received beacon message;

determining priorities of the beacon messages based on the message contents and based on a message content based priority rule set, wherein the message contents are separate from the beacon identifiers, and wherein determining the priorities comprises determining the priorities based on the flags;

selecting a beacon message of the beacon messages based on the priorities to produce a selected beacon message; and presenting the selected beacon message through the mobile device.

18. The mobile device of claim 17, wherein the operations comprise:

determining range estimations between the mobile device and the beacon devices based on received signal strength values corresponding respectively to the beacon messages, and wherein determining the priorities comprises:
performing a proximity-based message priority determination based on the range estimations, and
performing a content-based message priority determination based on the message content based priority rule set and one or more of the message contents.

19. The mobile device of claim 18, wherein the proximity-based message priority determination produces a tie among two or more of the beacon messages in terms of message priority, and wherein determining the priorities comprises using the content-based message priority determination to break the tie among the two or more of the beacon messages.

20. The mobile device of claim 17, wherein the operations comprise:

determining range estimations between the mobile device and the beacon devices based on received signal strength values corresponding respectively to the beacon messages, wherein determining the priorities comprises using the range estimations such that a message from a beacon device that is closer to the mobile device has a higher priority than a message from a beacon device that is farther away from the mobile device.

21. The mobile device of claim 17, wherein receiving the beacon messages comprises receiving first beacon messages from a first beacon device, and receiving second beacon messages from a second beacon device, and wherein determining priorities comprises using hysteresis to prevent changes in the priorities that are due to transitory fluctuations in received signal strength values associated with the first beacon messages, the second beacon messages, or both.

22. The mobile device of claim 17, wherein the operations comprise:
   determining a reason code in response to a visit by a user of the mobile device to the establishment; and
   accessing a reason based rule set based on the reason code, wherein determining the priorities comprises applying the reason based rule set.

23. The mobile device of claim 17, wherein determining the priorities comprises:
   determining whether a beacon message of the beacon messages has been previously presented to a user of the mobile device.

24. The mobile device of claim 17, comprising:
   a screen coupled with the processor,
   wherein the operations comprise retrieving content corresponding to one or more values included in the selected beacon message, wherein presenting the selected beacon message comprises displaying the retrieved content on a screen of the mobile device.

* * * * *